United States Patent

[11] 3,612,675

[72] Inventor Joseph W. Ruta
Chicago, Ill.

[21] Appl. No. 883,767
[22] Filed Dec. 10, 1969
[45] Patented Oct. 12, 1971
[73] Assignee GAF Corporation
New York, N.Y.
Continuation-in-part of application Ser. No. 834,483, June 18, 1969.

[54] SYNCHRONIZING CIRCUIT
9 Claims, 3 Drawing Figs.

[52] U.S. Cl. .......... 353/15
[51] Int. Cl. .......... G03b31/00, G03b 31/06
[50] Field of Search .......... 352/12, 13; 353/15

[56] References Cited

UNITED STATES PATENTS

| | | | |
|---|---|---|---|
| 2,975,672 | 3/1961 | Shields | 353/15 |
| 3,110,216 | 11/1963 | Chalfin | 353/15 |
| 3,276,315 | 10/1966 | Chalfin | 353/15 |
| 3,342,103 | 9/1967 | Fabrey | 353/15 |
| 3,420,966 | 1/1969 | Wright | 353/15 |

*Primary Examiner*—Leonard Forman
*Assistant Examiner*—Paul G. Foldes
*Attorney*—McDougall, Hersh & Scott

ABSTRACT: An electronic switch and a signal-producing circuit are provided in a system for synchronizing the operation of a slide projector with the operation of a tape recorder. The electronic switch and the signal-producing circuit are interconnected in such a way that when a single operating member is actuated for operating the system in a recording mode for synchronizing the recording of intelligence on one track of a tape with the slide changer of the slide projector, the signal-producing circuit will be energized to produce a stable control signal which is recorded on the same or another track of the tape simultaneously with triggering on of the electronic switch to energize a slide-changing device in the projector. The system also includes a normally closed circuit path between the electronic switch and the tape recorder for operating the system in a playback mode to change the slides in synchronization with the playback of intelligence from the tape.

INVENTOR
JOSEPH RUTA
BY Griest, Lockwood, Greenawalt & Dewey
ATT'YS.

INVENTOR
JOSEPH W. RUTA
BY Greist, Lockwood, Greenawalt & Dewey
ATT'YS.

SYNCHRONIZING CIRCUIT

BACKGROUND OF THE INVENTION

This application is a continuation-in-part of application Ser. No. 834,483, filed June 18, 1969.

The present invention is an improvement over prior synchronizing systems, such as the system shown and described in U.S. Pat. No. 2,975,672, issued to George B. Shields on Mar. 21, 1961. In this respect, the present invention provides a new and improved control or synchronizing system which is operative in both a recording mode and a playback mode for synchronizing the operation of a visual display device (a slide projector) with the operation of a recording and playback device (a tape recorder). The improved synchronizing system utilizes a signal-producing means (a relaxation oscillator), an electronic switch (a bidirectional semiconductor switch), and a mechanical switch. As intelligence is recorded on a tape in a tape recorder during the recording mode, the mechanical switch is operated to connect the electronic switch with the signal-producing means, first for applying proper biasing voltage to an electronic component of the signal-producing means to energize the same, and secondly for applying the signal therefrom to the electronic switch to turn the same on for cycling a slide-changing device in the slide projector, and simultaneously recording the signal on the tape. During the playback mode, a transducer in the tape recorder is operatively connected with the electronic switch so that the recorded signal picked up by the transducer will be fed directly to the electronic switch to turn on the same to cycle the slide-changing device in synchronization with the playback of recorded intelligence from the tape.

OBJECTS OF THE INVENTION

A primary object of the present invention is the provision of a new and improved means for synchronizing the operation of a visual display device with the operation of a recording and playback device.

Another object of the present invention is the provision of a new and improved control or synchronizing system of the type described including a signal-producing means which is utilized, during the recording mode only, for producing and transmitting a control signal to a tape recorder.

Another object of the present invention is the provision of a new and improved control system of the type described including a single channel by which proper biasing potential is applied to a component of the signal-producing means for energizing the same and by which a signal from the signal-producing means is applied to the electronic switch for triggering the same.

Another object of the present invention is the provision of a new and improved control or synchronizing system of the type described in which an electronic switch is connected to a signal-producing means in such a way that, when a single operating member is actuated for operating the system in a recording mode for synchronizing the recording of intelligence on one track of a tape with slide changes, the signal-producing means will be energized to produce a stable control signal which is recorded on the same or another track of the tape simultaneously with the turning on of the electronic switch to energize a slide-changing means.

Another object of the present invention is the provision of a control or synchronizing system of the type described which includes an electronic switching circuit and a signal-producing circuit each of which is complete in itself and which is arranged to function in one manner only during either the recording mode of operation or the playback mode of operation of the control system.

Still another object of the present invention is the provision of a new and improved control or synchronizing system of the type described which utilizes a bidirectional gate-controlled semiconductor switch for applying alternating current to a display changing device in a slide projector.

These and other objects and advantages of the present invention will become apparent from the following specification disclosing a preferred embodiment shown in the accompanying drawings.

DESCRIPTION OF A PREFERRED EMBODIMENT

Figure 1:
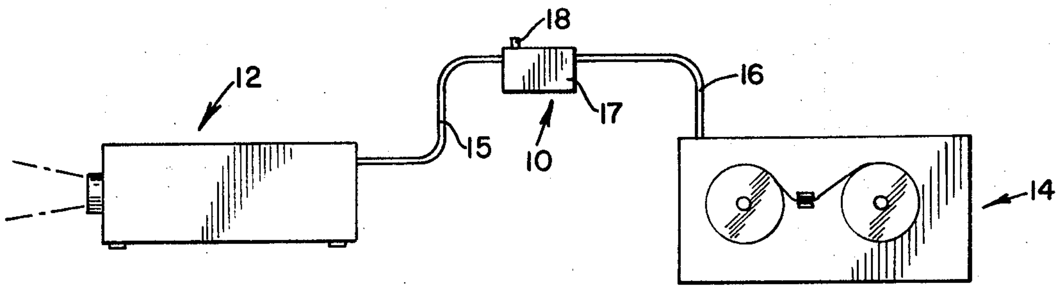
FIG. 1 is a side elevational view of the synchronizing unit of this invention connected between a tape recorder and a slide projector.

A control or synchronizing unit 10 is connected between a visual display device 12 and a recording and playback device 14. The visual display device 12 is typically a film projector, such as a slide projector, which sequentially projects images from film slides and which is connected to the control unit 10 by a multiconductor cable 15. Typically, the recording and playback device is a tape recorder which has a tape having one or more recording tracks and which is connected to the control unit 10 by a coaxial cable 16.

The control unit 10 includes a housing or casing, generally indicated at 17 in FIG. 1. A pushbutton 18 extends from the casing 17 and is connected inside the casing 17 to a switching mechanism which will be described in detail in connection with the description of FIG. 2. Preferably, the casing 17 is formed so as to be readily received in an operator's hand whereby the pushbutton 18 can be easily manipulated (depressed) by an operator's thumb or finger. It is to be understood that during a recording mode the button 18 is depressed to cycle the slide projector and at the same time to actuate the synchronizing unit 10 to produce a control signal which is transmitted via the cable 16 to the tape recorder 14. This control signal will be recorded on one track of the tape in the tape recorder simultaneously with the operation of the slide-changing device. Preferably, the tape used in the tape recorder has at least two tracks, one track for recording the control signals and the other track for recording intelligence to be payed back in synchronization with the sequential presentation of the slides.

Figure 2:
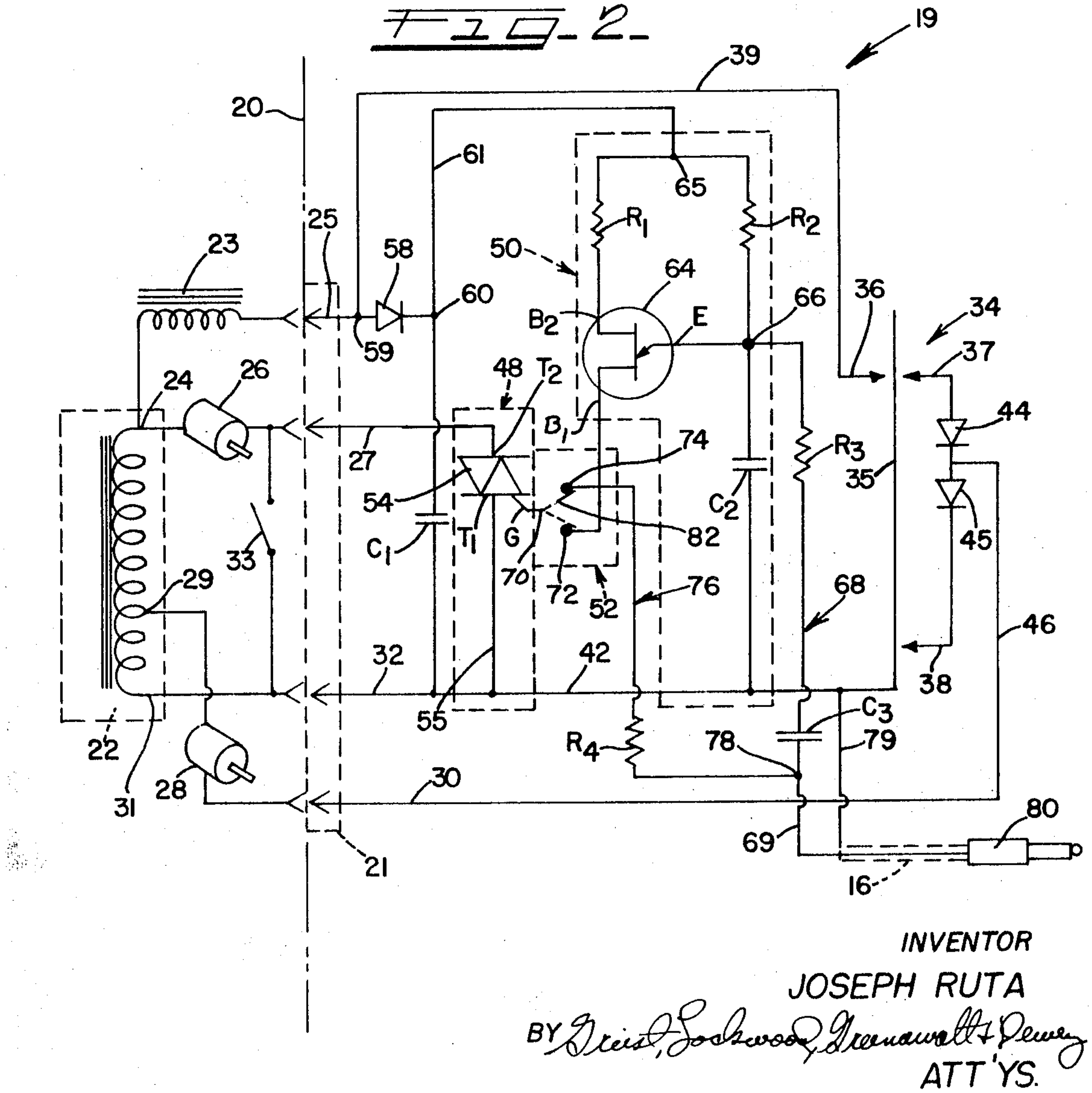
FIG. 2 is a schematic diagram of the electrical circuit of the synchronizing system which is contained in the synchronizing unit shown in FIG. 1; and, FIG. 3 is a schematic diagram of a modified electrical circuit of the synchronizing system.

Referring now to FIG. 2, the control system contained in the control unit 10 is generally indicated at 19 and is delineated from the components of the slide projector 12 which are shown in FIG. 2 by a broken line 20. Preferably, one end of the cable 15 has a four-terminal plug which is indicated schematically at 21 and which facilitates easy connecting and disconnecting of the cable 15 with the projector 12.

The components of the slide projector 12 which are operatively associated with the control unit 10 include a secondary winding 22 of a fan motor (not shown) in the projector 12, a reversing solenoid 23 connected between one end 24 of the winding 22 and a conductor 25 in the cable 15 leading to the control system 19, a cycling motor 26 connected between the end 24 of the secondary winding 22 and a conductor 27 in the cable 15, and a focusing motor 28 connected between a tap 29 on the winding 22 and a conductor 30 in the cable 15. The other end 31 of the winding 22 is connected to a conductor 32 in the cable 15 leading to the control system 19.

The cycling motor 26 is mechanically connected to a slide-changing device (not shown) for driving the same and also to a mechanism (not shown) for actuating a cycle-hold switch indicated schematically at 33. Typically, the cycle-hold switch 33 is of the type shown and described in U.S. Pat. No. 3,103,637 issued to Kenneth E. Golden on Apr. 28, 1966, wherein the cycle-hold switch is spring biased to a closed position for maintaining the cycling motor energized for and during one cycle of operation of the slide-changing device. After a cycle of operation of the slide-changing device has been completed, a cam (not shown) rotated by the cycling motor 26 through a gear mechanism (not shown), will engage and open the cycle-hold switch 33 to place the cycling motor 26 in the starting position for another cycle of operation of the slide-changing device. Then, when the cycling motor 26 is actuated, the cam is moved away from the cycle-hold switch 33 to return the same to its closed position to maintain the cycling motor 26 energized by the voltage developed across the winding 22 until the cam again engages the cycle-hold switch 33 at the end of a cycle of operation of the slide-changing device. It is to be understood that the fan motor (not shown) operates continuously to cool the projector 12 when the projector is operating, and, as a result, the secondary winding 22 provides a constant source of energy in the form of alternating current.

The control system 19 may include a conventional switching mechanism, generally indicated at 34, including a stationary contact 35 and three movable contacts 36, 37 and 38. The movable contacts 36, 37 and 38 are actuated or moved by pushbuttons (not shown) similar to the pushbutton 18 shown in FIG 1. Such pushbuttons are typically mounted on the casing 17 for easy manipulation by the operator's hand. The movable contact 36 is connected by a lead 39 and conductor 25 to the solenoid 23 which is connected to the end 24 of the winding 22. The stationary contact 35 is connected by a lead 42 and conductor 32 to the other end 31 of the winding 22. When the movable contact 36 is pressed into engagement with the stationary contact 35, the solenoid 23 is connected in series with the winding 22 to provide an energizing circuit for the solenoid 23. When thus energized, the solenoid 23 will shift a slide-tray-indexing mechanism (not shown) to a forward or rearward indexing position of the mechanism. A slide-tray-indexing mechanism of this type is shown and described in the U.S. Pat. No. 3,130,637 referred to above and is adapted to position a slide tray (not shown) for movement in a forward direction or in a rearward direction during operation of the projector 12.

The contacts 37 and 38 are connected, respectively, with two diodes 44 and 45 to provide a means for actuating the focus motor 28 to run in either a forward direction or a reverse direction for adjusting the projector objective lens (not shown) to achieve focusing. For this purpose, each of the diodes 44 and 45 is connected at one end, and in opposite polarity to each other to a lead 46 which is connected by the conductor 30 to the focus motor 28. The contact 37 is connected to the other end of the diode 44 and the contact 38 is connected to the other end of the diode 45. When the movable contact 37 is pressed into engagement with the stationary contact 35, a circuit is completed for energizing the focus motor 28 to run in one direction with current flowing from the end 31 of the winding 22 through conductor 32, lead 42, contact 35, contact 37, diode 44, conductor 30 and focus motor 28 to the tap 29 of the winding 22. On the other hand, when the movable contact 38 is pressed into engagement with the stationary contact 35, a circuit is completed for energizing the focus motor 28 to run in the opposite direction with current flowing from the tap 29 of the winding 22 through focus motor 28, conductor 30, lead 46, diode 45, contact 38, contact 35, lead 42, conductor 32 to the end 31 of the winding 22.

As illustrated by broken lines in FIG. 2, the control system 19 of the present invention includes an electronic switching circuit 48, a signal-producing circuit 50 and a mechanical switch 52.

Preferably, the electronic switching circuit 48 includes an electronic switch 54, such as a gate-controlled bidirectional semiconductor having a gate G, a first terminal $T_1$ and second terminal $I_2$. The semiconductor 54 blocks voltages in either direction and conducts current in either direction. This type of semiconductor is commonly referred to as a "triac." The terminal $T_1$ is connected to the lead 42 by a lead 55 and the terminal $T_2$ is connected directly to the conductor 27 in the cable 15. The gate G is connected to the mechanical switch 52.

The signal-producing circuit 50 is preferably a relaxation oscillator circuit which is energized by a small leakage current flowing through the reversing solenoid 23. The leakage current, which is insufficient to actuate the solenoid 23, is rectified by a diode 58 and filtered by a capacitor $C_1$ to provide positive DC voltage for energizing the relaxation oscillator circuit 50. Stated differently, the winding 22, the solenoid 23, the diode 58 and the capacitor $C_1$ provide or form a power supply means for the oscillator circuit 50 with the diode 58 connected at one end to a junction 59 (connected to the conductor 25 and the lead 39) and at the other end to a junction 60. A lead 61 from the junction 60 connects the other end of the diode 58 to the relaxation oscillator circuit 50 and capacitor $C_1$ is connected between the junction 60 and the lead 42.

The relaxation oscillator circuit 50 is of the type which uses a unijunction transistor generally indicated at 64. The unijunction transistor 64 is a semiconductor device which has an emitter terminal E and two base terminals $B_1$ and $B_2$ and is sometimes referred to as a double-base diode. The unijunction transistor 64 can be triggered by (or an output can be taken from) each of the three terminals E, $B_1$ and $B_2$. A first resistor $R_1$ is connected between a junction 65 connected to the lead 61 and the base terminal $B_2$ of the transistor 64 and serves as a load- or current-limiting resistor for the current flowing to the base terminal $B_2$. A second resistor $R_2$ is connected between the junction 65 and a junction 66 connected to the emitter terminal E. The resistor $R_2$ controls the charging current for a capacitor $C_2$ connected between the junction 66 and the lead 42. The capacitor $C_2$ is charged by the leakage current from the reversing solenoid 23. This leakage current flows from the winding 22 through the solenoid 23, the diode 58, the lead 61, the junction 65, the resistor $R_2$, the capacitor $C_2$ and then back through the lead 42 and the conductor 32 to the winding 22.

When a base biasing potential is applied across the two base terminals $B_2$ and $B_1$, a voltage gradient is established in the transistor 64 between the base terminals $B_1$ and $B_2$. If an external potential is applied across the base terminal $B_1$ and the emitter terminal E and is greater than the internal voltage gradient between the base $B_1$ and emitter E terminals, the junction between the emitter E and the base $B_1$ in the transistor 64 is forward biased and the transistor 64 is "turned on." If the external potential between these same two terminals is less than the internal voltage gradient, the junction between the emitter E and the base $B_1$ is reverse biased and the transistor 64 is "turned off." With a proper biasing potential applied across the base terminals $B_2$ and $B_1$, a positive trigger pulse or voltage applied to the emitter terminal E from the capacitor $C_2$ will forward bias the junction between the emitter E and the base $B_1$ and the transistor 64 is "turned on." Emitter current will then begin to flow from the capacitor $C_2$ into the emitter terminal E. This emitter current will increase until the capacitor $C_2$ is sufficiently discharged to a point where the voltage drop across the capacitor $C_2$ is below the internal voltage between the emitter terminal E and the base terminal $B_1$. Then, the junction between the emitter E and the base $B_1$ is reverse biased and the transistor 64 is "turned off." Once proper biasing potential is applied across base terminals $B_2$ qnd $B_1$, charging and discharging of the capacitor $C_2$ will turn on and turn off the transistor 64 whereby an alternating signal, i.e., an oscillating signal, is developed at the emitter terminal E connected to the junction 66.

A signal-recording channel 68 including a resistor $R_3$ and a capacitor $C_3$ is connected between the junction 66 and one conductor 69 of the coaxial cable 16 leading to the tape recorder 14, so that the oscillating signal appearing at the junction 66 is coupled by the resistor $R_3$ and the capacitor $C_3$ to the tape recorder 14 and recorded on a control track of a tape in the recorder 14.

The mechanical switch 52 is a three-terminal, single-pole double-throw switch including a middle or common terminal 70 and two end terminals 72 and 74. The middle terminal 70 of the switch 52 is connected to the gate G of the electronic switch 54. One of the end terminals 72 of the switch 52 is connected to the base terminal $B_1$ of the transistor 64 and the other end terminal 74 is connected to a signal playback channel 76 which is connected to a junction 78 between the signal-recording channel 68 and he conductor 69. Preferably, the signal playback channel 76 includes a current-limiting resistor $R_4$.

Another conductor 79 of the coaxial cable 16 is connected to the lead 42 for completing the electrical circuit (for recording or playback) between the cable 16 and the control system 19. Preferably, the end of the cable 16 leading to the recorder 14 terminates in a jack 80 to provide a means for easily connecting and disconnecting the cable 16 with a mating socket (not shown) in the tape recorder 14.

Referring now to the operation of the control system 19, the pushbutton 18 operates a movable contact 82 (which is connected to the middle terminal 70 of the switch 52) for moving the contact 82 between the terminals 72 and 74. Preferably, the pushbutton 18 is resiliently biased outwardly from the casing 17. In a first (normal) position, the movable contact 82 is in engagement with he terminal 74 so that the signal playback channel 76 is connected to the gate G of the electronic switch 54. This is the playback position since any control signals picked up from the control track of the tape in the tape recorder 14 will be transmitted via the signal playback channel 76, the terminal 74 and the contact 82 to the gate G of the electronic switch 54. It will be understood that the electronic switch 54 is of the type which has a highly sensitive gate G so that the control signals played back will be of sufficient magnitude to turn on the switch 54 without amplification. When the electronic switch 54 is turned on, circuit for energizing the cycling motor 26 is completed. The motor 26 will then start the cycle of operation of the slide-changing device and the switch 33 will be closed, as previously explained, to maintain the cycling motor 26 energized for a predetermined period of time independent of the electronic switch 54. With this arrangement operation of the cycling motor 26 is not dependent upon the duration of he played-back control signal once the switch 33 is closed.

During the recording mode of operation of the control system 19, the pushbutton 18 is depressed against the resilient means to complete a single channel between the electronic switch 54 and the transistor 64 by placing the movable contact 82 in a second or recording position where the contact 82 is in engagement with the other end terminal 72. When this occurs, proper biasing potential is applied across the base terminals $B_2$ and $B_1$ of the transistor 64. The circuit for applying this potential can be traced as follows: from the end of the winding 22 through the solenoid 23, the conductor 25, the diode 58, the lead 61 and resistor $R_1$ to the base terminal $B_2$; and from the base terminal $B_1$ through the channel formed by the terminal 72, the contact 82, the gate G and the terminal $T_1$ of the electronic switch 54 to the lead 55, the lead 42, and the conductor 32 to the other end 31 of the winding 22. It will be understood that, in the turned-off or nonconducting state of the transistor 64, the resistance across the base terminals $B_2$ and $B_1$ will be much greater than the resistance across the gate G and the terminal $T_1$, whereby a large proportion of the voltage appearing at the junction 60 will appear across the base terminals $B_2$ and $B_1$ for forward biasing the base terminals $B_2$ and $B_1$.

Once a proper biasing potential is applied across the base terminals $B_2$ and $B_1$, the junction between the emitter E and the base $B_1$ will be forward biased, the capacitor $C_2$ will start to discharge, and emitter current will flow from the capacitor $C_2$ into the emitter terminal E through the transistor 64 and out of the base terminal $B_1$ to o the gate G and thereby turn on the electronic switch 54. Of course, when the voltage across the capacitor $C_2$ drops below the internal voltage potential between the emitter terminal E and the base terminal $B_1$, the emitter current will stop flowing and the capacitor $C_2$ will start charging again with the leakage current flowing through the resistor $R_2$. The charging and discharging of the capacitor $c_2$ will occur quite rapidly, depending on the values of the capacitor $C_2$ and resistor $R_2$, to produce an alternating control signal or voltage at the junction 66. This control signal is transmitted by the signal-recording channel 68 and the cable 16 to the recorder 14 for recording on one track of the tape in the recorder 14.

Preferably, the control signal is at frequency which is much higher than the frequency of the leakage current flowing through the solenoid 23 from the winding 22. For example, with a 60-Hz. leakage current, the values of the resistor $R_2$ and the capacitor $C_2$ can be chosen so that a 3,000-Hz. control signal is developed by the relaxation oscillator circuit 50.

The value of the resistor $R_1$ is chosen so that the emitter current will be much greater than the current flowing between base terminals $B_2$ and $B_1$ so that the turn on current flowing to the gate G will be essentially the emitter current. In this way the turn-on signal or current to the gate G will have essentially the same waveform and frequency as the control signal recorded on the tape, and it can be said that the electronic switch 54 is turned on by the same signal which is recorded on the tape.

When the electronic switch 54 is turned on by the emitter current, a circuit is completed for energizing the cycling motor 26 to change the visual display in synchronization with the recording of the control signal on the tape in the recorder 14, with the energizing current flowing from the end 24 of the winding 22 through cycling motor 26, conductor 27, electronic switch 54, lead 55 and conductor 32 to the end 31 of the winding 22. The cycling motor 26 will then move the cam away from the switch 33 allowing the latter to close to maintain an energizing circuit for the cycling motor 26 through one cycle of operation of the slide-changing device as previously explained. Accordingly, once the switch 33 is closed, the operation of the cycling motor 26 is not dependent upon continued depression of the pushbutton 18. Typically, a minimum control signal duration of approximately 150 milliseconds is needed before switch 33 is closed.

Figure 3:
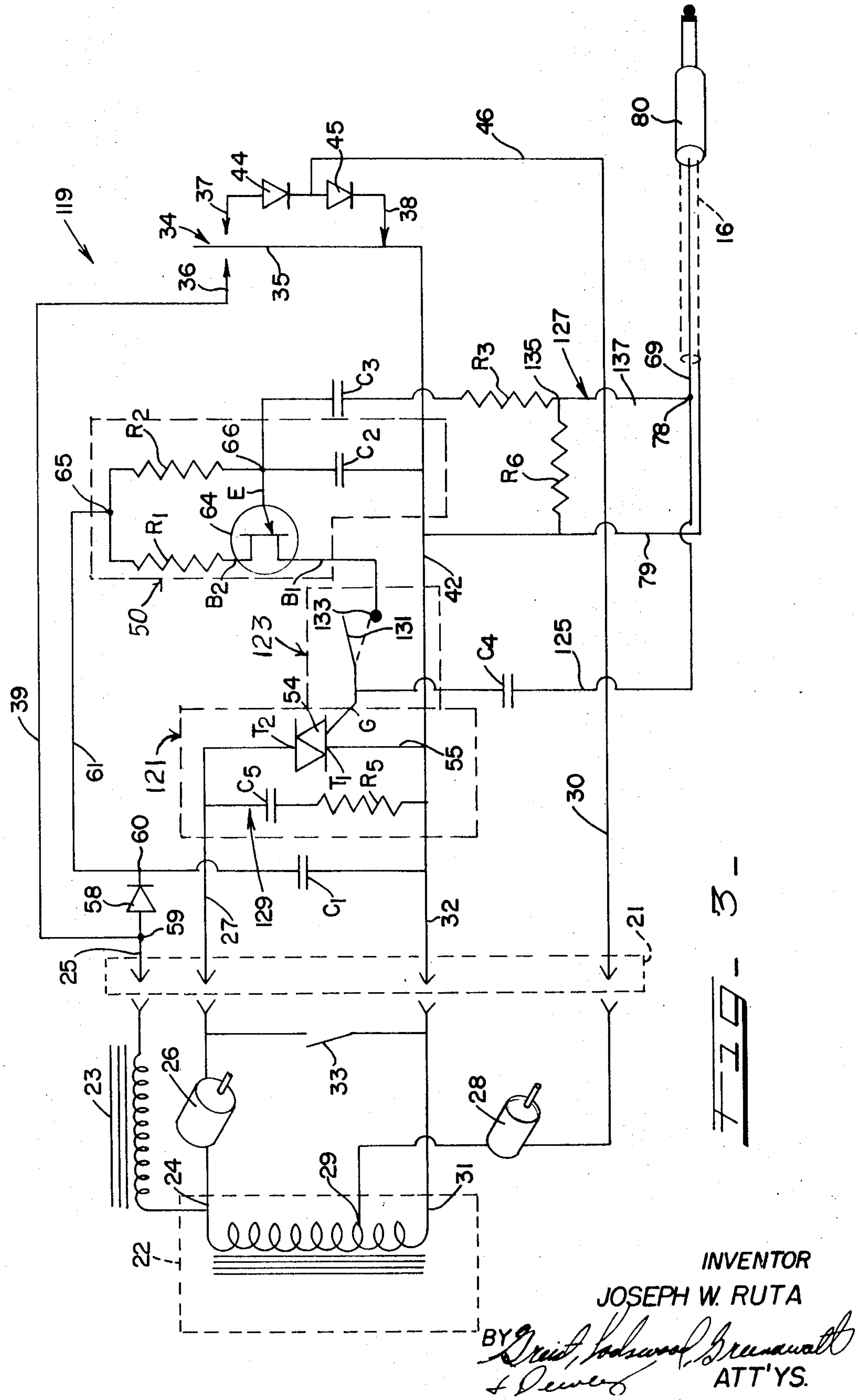

A modified form of control system is generally indicated at 119 in FIG. 3. Since many of the circuit elements of the modified control system 119 are identical with the circuit elements of the control system 19 shown in FIG. 2, the same reference numerals used in FIG. 2 are used in FIG. 3 to identify such circuit elements.

The control system 119 is different than the control system 19 shown in FIG. 2 by the provision of a modified electronic switching circuit 121, single-pole single-throw mechanical switch 123, a modified signal playback channel 125 and a modified signal-recording channel 127. In other respects, the control system 119 is the same as the control system 19.

The modified electronic switching circuit 121 includes a transient suppressor circuit 129 connected between the lead and the conductor 42 in parallel with the electronic switch 54. The transient suppressor circuit 129 includes a capacitor $C_5$ in series with a resistor $R_5$.

The single-pole single-throw mechanical switch 123 has a movable contact member 31 connected to the gate G of the electronic switch 54 and a stationary contact member 133 which is connected to the base $B_1$ of the transistor 64. In this modified control system 119, the signal playback channel 125 is connected directly to the gate G and the mechanical switch 123 does not open circuit playback channel 125 when the movable contact member 131 is moved into contact with the stationary contact member 133 to energize the oscillator circuit 50.

However, the signal playback channel 125 has a capacitor $C_4$ instead of the resistor $R_4$ to prevent the recording of 60-Hz. signals (from current flowing through the gate G of the electronic switch 54) on the tape in the tape recorder 14. In this regard, capacitor $C_4$ presents sufficient capacitive impedance to 60-Hz. current, which may pass through the gate G when the electronic switch 54 is conducting, to attenuate the signal from such current to a very small value. Thus, little, if any, 60-Hz. signal is fed through the signal playback channel 125 to the tape recorder 14.

On he other hand, the capacitor $C_4$ presents a small capacitive impedance to the higher frequency (e.g., 3,000-Hz.) signal which is played back from the tape on the tape recorder 14. In this way, most of the signal on the tape is fed through the playback channel 125 to the gate G of the electronic switch 54.

By providing the capacitor $C_4$ in the signal playback channel 125 and by connecting the signal playback channel 125 directly to the gate G of the electronic switch 54, a simpler mechanical switch can be utilized in place of the switch 52 shown in FIG. 2, namely, the single-pole single-throw switch 123 can be utilized.

To provide control of the signal recorded on the tape in the tape recorder 14, the modified signal-recording channel 127 includes an additional resistor $R_6$ which is connected with the resistor $R_3$ to form a potential divider circuit. For this purpose, the capacitor $C_3$ is connected at one end to the emitter E of the transistor 64 and the resistor $R_3$ is connected between the other end of the capacitor $C_3$ and the junction 78. The resistor $R_6$ is connected between the junction 78 and the conductor 79. In this way, the resistors $R_3$ and $R_6$ form a potential divider at a junction 135 therebetween. As shown, the junction 135 is connected by a conductor 137 to the junction 78. If desired, the resistor $R_6$ can be a variable resistor for adjusting the amplitude of the control signal which is fed through the signal-recording channel 127 and recorded on the tape.

The operation of the modified control system 119 is essentially the same as the operation of the control system 19 shown in FIG. 2. Thus, when the movable contact member 131 is depressed and brought into contact with the stationary contact member 133 the oscillator circuit 50 is energized to produce the control signal which is recorded on the tape in the tape recorder 14 and at the same time is fed to the gate G of the electronic switch 54 for turning on the electronic switch 54 to energize the cycling motor 26. However, with the modified signal-recording channel 127, the amplitude of the recorded signal can be controlled.

As explained above, any leakage current flowing through the gate G of the electronic switch 54 when it is conducting will be attenuated by the capacitor $C_4$ so that very little, if any, 60-Hz. signal is recorded on the tape in the tape recorder 14. Also, to prevent any transient signals from passing through the capacitor $C_4$ and being recorded on the tape in the tape recorder 14 when the switch 33 is opened, the transient suppressor circuit 129 is provided. As is well known in the art, any transient current, such as a transient current induced by the collapsing of the magnetic field in the motor 26, will be absorbed by the capacitor $C_4$ which acts as a low-impedance path to high-frequency transient currents. Also, the magnitude of such currents will be limited by the resistance $R_5$. The resistor $R_5$ also serves as a load resistor for dissipating he energy from such transient currents. Of course, to prevent operation of the cycling motor 26 when the electronic switch 54 is not conducting, in the steady state condition the transient suppressor circuit 129 will present a very high impedance to the 60-Hz. voltage from the winding 22 and very little current flows through the transient suppressor circuit 129 and the cycling motor 26. In this way, transient currents are suppressed and prevented from passing through the capacitor $C_4$ in the signal playback channel 125 and being recorded in the tape recorder 14. Without the transient suppressor circuit 129, transient currents can be recorded on the tape in the recorder 14 and in some cases can cause erratic performance of the cycling motor 26. In other respects, the operation of the modified control system 119 shown in FIG. 3 is the same as the operation of the control system 19 shown in FIG. 2.

With the control system 19 or 119 of the present invention, it will be appreciated that the control signal recorded on the tape has a discrete stable frequency and does not have any overtones or beats, such as 60-cycle overtones of the type commonly incurred in prior art control systems. Moreover, in the control system 19 or 119, the oscillator circuit 50 is always used as an oscillator circuit for producing a signal and the electronic switch 54 is always used as an electronic switch for energizing the cycling motor 26. In the control system 19 or 119, the played-back control signal from the control track of the tape is applied directly to the gate G of the electronic switch 54 and is not amplified by any part of the oscillator circuit 50. Stated otherwise, the transistor 64 in the oscillator circuit 50 is only used as an oscillating element of the system 19 or 119 and is not used in either the recording mode or the playback mode as an amplifying element.

I claim:

1. A system operative in recording mode and in a playback mode for synchronizing the operation of visual display device with the operation of a recording and playback device, said display device including means for changing the visual display and means for energizing said display-changing means and actuating the same, said system including electronic switch means connected with said energizing means and said display-changing means and adapted, when turned on, to allow current to flow from said energizing means to said display-changing means for actuating said display-changing means and, when turned off, to prevent the energization of said display-changing means, signal-producing means connected to said recording and playback device, and mechanical switch means for connecting said electronic switch means to said signal-producing means during said recording mode to energize said signal-producing means to produce a control signal which is recorded in said recording and playback device and which is simultaneously applied through said mechanical switch means to said electronic switch means for turning on the electronic switch means simultaneously with the recording of said signal in said recording and playback device.

2. The system of claim 1 in which said signal-producing means includes an electronic component and said mechanical switch is adapted, when operated during said recording mode, to establish a single channel between said electronic component and said electronic switch means by which proper biasing potential is applied to said electronic component of said signal-producing means for energizing same and by which a signal from said signal-producing means is applied to said electronic switch means for turning on said electronic switch means.

3. The system of claim 1 in which said mechanical switch means comprises a single-pole, double-throw switch having a movable contact member connected to said electronic switch means, a first stationary contact member connected to said signal-producing means and a second stationary contact member connected to a signal playback channel leading to said recording and playback device, said movable contact member normally being in contact with said second stationary contact member whereby, when said system is operating in said playback mode, recorded signals played back by said recording and playback device will be transmitted by said signal playback channel to said electronic switch means to turn on the same for actuating said display-changing means, and, when said system is operated in said recording mode by moving said movable contact member into contact with said first stationary contact member said electronic switch means is connected by said mechanical switch means to said signal-producing means to energize the same for producing a control signal which is applied to said electronic switch means to turn on said electronic switch means and which is simultaneously recorded in said recording and playback device.

4. The system of claim 1 in which said mechanical switch means comprises a single-pole, single-throw switch having a movable contact member connected to said electronic switch means and a stationary contact member connected to said signal-producing means, and a signal payback channel is connected between said recording and playback device and said electronic switch whereby, when said system is operating in said playback mode, the recorded signals played back from said recording and playback device will be applied directly to said electronic switch means for energizing said slide-changing device in syncronization with the playback of recorded information from said recording and playback device.

5. The system of claim 4 in which said signal playback channel includes a reactive impedance means which presents a high impedance to low-frequency leakage current from said electronic switch means when said electronic switch means is turned on and which presents a low impedance to the higher frequency control signal played back from said recording and playback device to permit said played back control signal to turn on said electronic switch means.

6. The system of claim 1 in which said signal-producing means includes a relaxation oscillator circuit.

7. The system of claim 6 in which said relaxation oscillator circuit includes a unijunction transistor.

8. The system of claim 1 including a signal-recording channel which is connected between said signal-producing means and said recording and playback device and which includes coupling resistor and a coupling capacitor for coupling said signal-producing means to said recording and playback device.

9. A system for synchronizing the operation of a visual display device with the operation of a recording and playback device, said display device including means for changing the visual display nd means for energizing said display-changing means and actuating the same, said system including an electronic switch means connected with said energizing means and said display-changing means, a signal-producing means connected to said energizing means, a signal-recording channel connected between said signal-producing means and said recording and playback device, mechanical switch means operable in a first position to connect said recording and playback device to said electronic switch means and operable in second position to connect said electronic switch means to said signal-producing means, said mechanical switch means normally being in its first position connecting said electronic switch means with said recording and playback device whereby signals played back by said recording and playback device will be transmitted directly to said electronic switch means without activating said signal-producing means to turn on said electronic switch means to complete an energizing circuit between said energizing means and said display-changing means for operating said display-changing means, and said mechanical switch means being adapted, when in its second position, to connect said signal-producing means with said electronic switch means for completing a circuit between said energizing means and said signal-producing means for applying energizing potential to said signal-producing means and for applying a control signal produced by said signal-producing means to said electronic switch means to turn on said electronic switch means to complete said energizing circuit for operating said display-changing means simultaneously as said control signal is being transmitted by said signal-recording channel to said recording and playback device for recording therein, said electronic switch means, when turned off, preventing the completion of an energizing circuit between said energizing means and said display-changing means.